| (12) | United States Patent | (10) Patent No.: | US 9,460,432 B2 |
|---|---|---|---|
| | Chintakayala | (45) Date of Patent: | Oct. 4, 2016 |

(54) ON-PREMISES DEVICE TRANSACTION COLLABORATION

(71) Applicant: NCR Corporation, Duluth, GA (US)

(72) Inventor: Prasad Chintakayala, Secunderabad (IN)

(73) Assignee: NCR Corporation, Duluth, GA (US)

( * ) Notice: Subject to any disclaimer, the term of this patent is extended or adjusted under 35 U.S.C. 154(b) by 0 days.

(21) Appl. No.: 14/499,612

(22) Filed: Sep. 29, 2014

(65) Prior Publication Data

US 2016/0092863 A1 Mar. 31, 2016

(51) Int. Cl.
*G06Q 40/00* (2012.01)
*G06Q 20/32* (2012.01)
*G06Q 40/02* (2012.01)

(52) U.S. Cl.
CPC .......... *G06Q 20/3223* (2013.01); *G06Q 40/02* (2013.01)

(58) Field of Classification Search
USPC .............................. 235/375, 379; 705/1.1–45
See application file for complete search history.

(56) References Cited

U.S. PATENT DOCUMENTS 8,566,203 B1 * 10/2013 Vieira et al. .................... 705/35

* cited by examiner

*Primary Examiner* — Jamara Franklin
(74) *Attorney, Agent, or Firm* — Schwegman, Lundberg & Woessner

(57) ABSTRACT

Various embodiments herein each include at least one of systems, methods, and software for on-premises device transaction collaboration. Some embodiments include a method. The method of such embodiments includes identifying a mobile device present within a facility and associating the mobile device with an account holder. Such embodiments further include transmitting, to the mobile device, data representative of transaction options identified in stored data based on an identity of the facility and the account holder.

17 Claims, 4 Drawing Sheets

ON-PREMISES DEVICE TRANSACTION COLLABORATION

BACKGROUND INFORMATION

Retail outlets, whether they are bank branches, stores, libraries, or other outlets, strive to provide timely and helpful customer service. This is particularly true with regard to transactions that may be the reason for a customer visit to the retail outlet or to conclude the visit prior to customer departure, such as with a checkout transaction at a store or library. At the same time, while such retail outlets strive to provide timely and helpful customer service, adding additional employees can be cost prohibitive.

SUMMARY

Various embodiments herein each include at least one of systems, methods, and software for on-premises device transaction collaboration.

Some embodiments include a method. The method of such embodiments includes identifying a mobile device present within a facility and associating the mobile device with an account holder. Such embodiments further include transmitting, to the mobile device, data representative of transaction options identified in stored data based on an identity of the facility and the account holder.

Another method embodiment includes storing data representative of bank branch properties including data representative of teller stations and transaction services available at each teller station. Such embodiments may also store data representative of account holders including data associating each account holder to at least one bank account. The method additionally includes receiving, via a network, a transaction option request from an app that executes on a mobile device, the transaction option request including an account holder identifier and bank branch identifying data. The method of such embodiments may then determine, in response to the transaction option request, available transaction options based on the stored data representative of the bank branch properties and stored data representative of account holders. Subsequently, the method may transmit, via the network to the app that executes on the mobile device, data representative of determined transaction options.

Another embodiment is in the form of a system. The system of such embodiments includes a network interface device and at least one database accessible via the network interface device. The database stores data representative of bank branch properties including data representative of teller stations and transaction services available at each teller station. The database further stores data representative of account holders including data associating each account holder to at least one bank account. The system of such embodiments also includes an interactive banking services module to perform data processing activities. These data processing activities may include receiving, via the network interface device, a transaction option request from an app that executes on a mobile device, the transaction option request including an account holder identifier and bank branch identifying data. The data processing activities may then determine, in response to the transaction option request, available transaction options based on the data representative of the bank branch properties and data representative of account holders as stored in the at least one database. Subsequently, the data processing activities may transmit, via the network interface device to the app that executes on the mobile device, data representative of determined transaction options.

These and other embodiments are described and illustrated herein.

DETAILED DESCRIPTION

Figure 1:
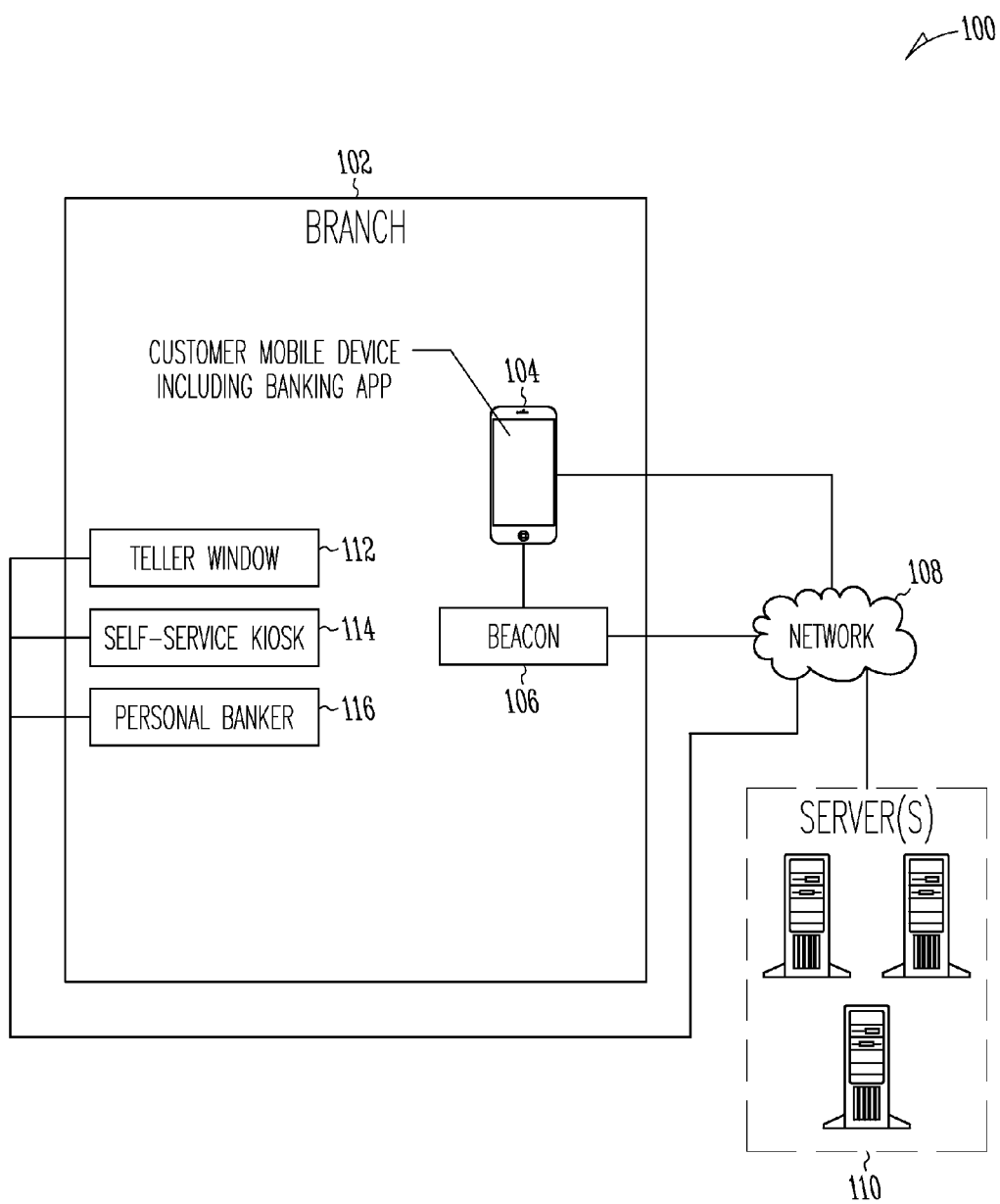
FIG. 1 is an architectural diagram of a system, according to an example embodiment.

Various embodiments herein each include at least one of systems, methods, and software for on-premises device transaction collaboration. Such embodiments are relevant in many contexts, such as when a customer visits a retail outlet, such as a bank branch, a store, a library, and the like. Some such embodiments provide customer's abilities to interact with the retail outlet on a customer's own mobile device, such as a smartphone or tablet. Such interaction may allow customers to obtain assistance and begin conducting a transaction prior to reaching a location where the transaction will be completed, such as at a clerk station, a clerk-assisted terminal, or self-service terminal (SST) to complete the transaction. In some embodiments, the SST may be an Automated Teller Machine (ATM), a self-service checkout station, and the like.

In some embodiments, a customer enters a bank branch carrying a mobile device having an app of the bank being entered. The app determines the current location to be the particular bank branch being entered. The app may determine the current location based on one or more of various positioning techniques, such as a Global Positioning System (GPS) sensor of the mobile device, a database of known positions of WI-FI® hotspots, one or more BLUETOOTH® beacon devices deployed in the bank branch, and the like.

In some such embodiments, the mobile device app transmits data including positioning data to a network service of the bank. The data transmitted to the network service of the bank may also include a user identifier of customer, such as when the customer has already signed into the app. In instances where the customer has not already signed into the app, the bank network service may reply to the mobile device app with a request for the customer to sign in, which the customer may then do. At the same time, the mobile device app may also present the customer with an option to create an online account and associate the online account with the customer's bank account(s). Once this process is complete, the customer may then be authenticated and signed into the app. In some further embodiments, when the customer does not have an existing relationship with the bank, the mobile device app may provide a user interface within which the customer may begin a process to open an account, such as by providing a name, address, phone number, Social Security Number, and the like. This data may then be transmitted to the network service of the bank and pre-staged for later when the customer meets with a personal banker or other bank personnel to complete a new account creation transaction. Pre-staging will be discussed further below.

In embodiments where the customer has been signed in to the app, the network service may then provide transaction options to the mobile device app that are specific to the bank branch. Such options may be determined by the network service based on the bank branch being visited in view of bank branch configuration data that may define a number of teller stations, Automated Teller Machines (ATM), personal bankers, mortgage bankers, and the like that are present in the bank branch, as well as their capabilities, such as for opening new accounts, taking mortgage applications, receiving deposits and servicing withdrawals, and the like. The mobile device app may then present these transaction options on the mobile device and receive a selection of one or more. The customer may then input data with regard to the one or more selected options and choose submit. Such input may be with regard to a withdrawal or deposit, a mortgage application, and the like. This data may then be transmitted to the bank network service.

Upon receipt of transaction data from a customer mobile device app, the network service then pre-stages the data for use in completing the one or more transactions of the customer selected transaction options. The network service may also determine a teller window, ATM, banker station, or other location or terminal within the bank branch to which the customer should be assigned to complete the one or more transactions. This determination may be made based on the one or more transactions to be completed and may also take into account availability of the location to which the customer is assigned as well as other customers that may have been assigned and queued up for the various locations. In some embodiments, the assignment may be determined based in part on a sensed or determined location of the customer within a bank branch in relation to terminals or stations capable of handling the customer transaction. The network service may then communicate the assignment to the mobile device app for presentation to the customer. The communication of the assignment may also include an estimated wait time that may also be presented by the mobile device app to the customer. At this point, the customer entered transaction data is pre-staged in the computing systems of the bank for subsequent use in completing the one or more transactions initiated by the customer on the mobile device.

When the customer reaches the front of the queue for a particular assigned location, the customer's identity may be verified, such as by a teller, presentment of a bankcard (e.g., ATM card, credit card, etc.) and Personal Identification Number (PIN), or other means. Once the customer's identity is verified, the transaction data entered by the customer in the mobile device app will be available on a computing device of the teller or other banker or on an SST, such as an ATM, for use in completing the transaction. This data may be or include the previously discussed data with regard to creating a new customer account.

These and other embodiments are described herein with reference to the figures.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, to be taken in a broad, non-limiting sense, and the scope of the inventive subject matter is defined by the appended claims.

The functions or algorithms described herein are implemented in hardware, software, or a combination of software and hardware in one embodiment. The software comprises computer executable instructions stored on one or more non-transitory computer readable mediums, such as memory or other types of storage devices. Further, described functions and processes may correspond to modules, which may be software, hardware, firmware, or any combination thereof. Multiple functions are performed in one or more modules as desired, and the embodiments described are merely examples. The software is executed on a digital signal processor, Application Specific Integrated Circuit (ASIC), microprocessor, or other type of processor operating on a system, such as a personal computer, mobile device, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flows are applicable to software, firmware, and hardware implementations.

FIG. 1 is an architectural diagram of a system 100, according to an example embodiment. The system 100 is deployed within a facility, such as a bank branch 102. Although bank branch 102 is illustrated and described, the system 100 may alternatively be deployed to other facilities, such as stores, libraries, and other facilities where customers or other patrons perform transactions.

The system 100 includes one or more servers 110 connected to a network 108. The servers 110 may be located in whole or in part within the bank branch 102 or elsewhere, such as in one or more remote data centers of a bank. The network 108 may be or include one or more wired and wireless local area networks (LAN), wide area networks (WAN), system area networks (SAN), mobile carrier networks, and global networks, such as the Internet.

Also connected to the network 108 are computing devices of branch 102 terminals, such as a teller window computer 112, a computer of a self-service kiosk 114, a personal banker computer 116, and the like. Further, a customer mobile device 104 is also connected to the network 108. In some embodiments, a beacon device 106 of a positioning system may also be connected to the network 108.

The customer mobile device 104 may be a smartphone, tablet, or other mobile computing device that may be carried by a customer within the bank branch 102. The customer mobile device 104 includes a banking app deployed thereon. The banking app executes to identify a location relative to bank branch locations, such as a location of the illustrated bank branch 102. The banking app may include a service that executes in the background of the mobile device 104 and provide a notification of available banking services via the app when the location of the mobile device 104 is at or near a bank branch. In other embodiments, the banking app may be selected for execution on the mobile device 104 by a customer and the location services may be executed at that time.

In operation, the mobile device 104 app may exchange data over the network 108 with the one or more servers 110 to provide the customer abilities to initiate transactions on the mobile device 104 that are to be completed at a bank branch 102 terminal, such as a teller window computer 112, a computer of a self-service kiosk 114, a personal banker computer 116, and the like. For example, a customer may desire to make a deposit or withdrawal. The customer may select such an option presented in the mobile device 104 app, enter data with regard to the desired transaction, such as an amount to withdrawal and a bank account from which the funds are to be taken, and the data may then be transmitted via the network 108 to the one or more servers 110. The one or more servers 110 may then pre-stage the transaction data and provide that data to a bank branch 102 terminal at which the customer is present to complete the transaction. Through such embodiments, customers are able to input their data while waiting for service and that data is then readily available at a time when the transaction is to be completed to speed the process, increase teller or other personnel efficiency, and enhance the overall customer experience.

At the same time, some customers may encounter issues or otherwise need or desire assistance when utilizing the mobile device 104 app. Thus, some embodiments of the system 100 may automatically detect such situations, such as by monitoring an app idle period within which a customer has not provided input, or may present a selectable customer assistance request user interface control. In such instances, the mobile device 104 is known to be present in the bank branch 102 and the mobile device 104 app may communicate a request for assistance to a system of the bank branch 102 directly via the network 108, indirectly via a service of the one or more servers 110, or otherwise. When a location of the mobile device 104 is known, such as in embodiments including a positioning system, that location may also be communicated. Bank branch 102 personnel may then seek out the customer in need of assistance within the bank branch 102 generally or more specifically at a location identified in the communication.

In system 100 embodiments including a positioning system, the bank branch 102 may include a positioning system deployed therein. A positioning system may include one or more devices, such as the beacon device 106, that broadcast signals that are received by mobile devices, such as mobile device 104. In some embodiments, positioning system devices may broadcast a radio signal that includes data encoded therein. The encoded data may be an identifier of the positioning device that broadcast the signal. The identifier may be used as an index to obtain positioning data, data identifying the bank branch 102 within which it is deployed, or other data that may be used to identify the bank branch 102, a location within the bank branch 102, or other positioning data.

The positioning data may be obtained from data stored on the mobile device 104 or as may be accessible via a wireless connection of the mobile device 104 from another device, such as the one or more servers 110 or a cloud-based web service. In other embodiments, a signal broadcast by a positioning system device may include positioning data that indicates a position or can be used to determine a position. Some such embodiments may also utilize a strength of a received signal to determine, or assume based on a threshold signal strength configuration, a distance of the mobile device from a positioning system device. Due to the nature of signaling, such as radio frequency signaling, a determined distance is typically not an actual distance, but rather a relative or approximate distance between a mobile device 104 and a positioning system device. Thus, a distance may be assumed based on the strength of signal in view of one or more signal strength thresholds of a process that identifies terminals proximately located to the mobile device 104.

The positioning system devices, in some embodiments, may include a radio transceiver device, such as a BLUETOOTH® beacon device. Among others, such beacon devices are available from NCR Corporation of Duluth, Ga. The positioning system devices may also, or alternatively, include WI-FI® Wireless Access Point (WAP) devices in some embodiments.

The positioning system devices may be standalone devices, integrated within another device or terminal, such as checkout stations, point-of-sale (POS) terminals, SSTs (e.g., self-service checkout stations, computer-enabled kiosks, Automated Teller Machines (ATMs)), and the like.

In some other embodiments, rather than relying upon a positioning system deployed within a facility such as the bank branch 102, a mobile device 104 app may obtain positioning data from an integrated GPS device, a positioning service accessible via a network such as the Internet that determiners mobile device 104 position based on one or more of wireless network towers and wireless access points to which the mobile device 104 is connected, or a combination of such solutions. However, knowledge of an exact position or knowing a position of the mobile device 104 is not necessary in all embodiments. The goal of the positioning solution is instead to provide a mobile device 104 app or network 108 accessible service with information identifying the bank branch 102 in which the mobile device 104 is located. While an exact position may be used in some embodiments, knowledge of a positioning system device within a certain radius of the mobile device or a relatively generalized position of the mobile device 104 can be sufficient in some embodiments.

In some embodiments, an identity of the bank branch 102 may be found in a lookup table or other data structure that associates locations or beacon devices with an identifier of the bank branch 102. The look up table may be store don the mobile device 104, be accessible via the network 108, or be accessed on the one or more servers 110. In other embodiments, the positioning system device may broadcast one or more signals that include encoded data identifying the bank branch 102.

Figure 2:
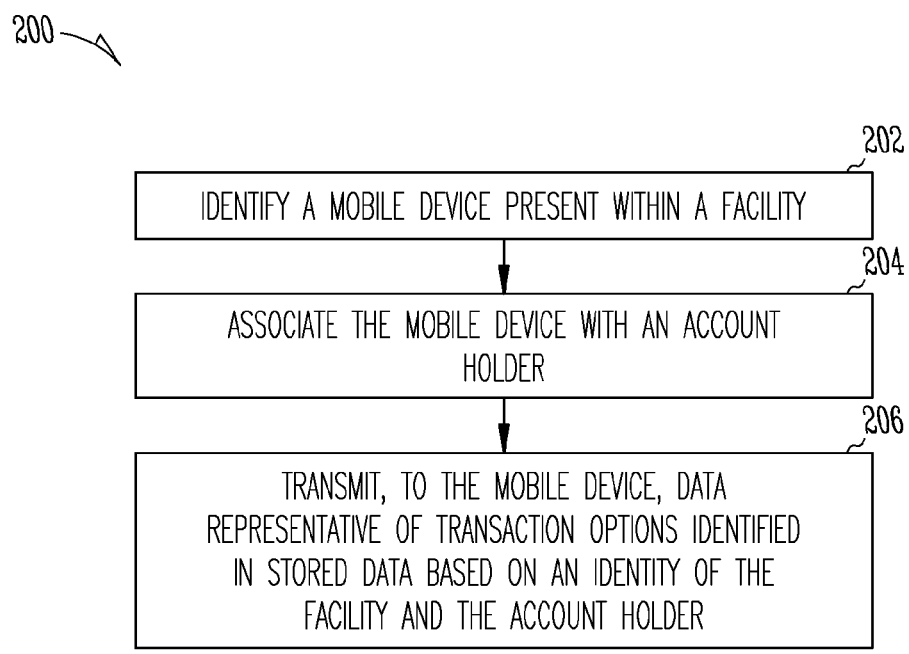
FIG. 2 is a block flow diagram of a method, according to an example embodiment.

FIG. 2 is a block flow diagram of a method 200, according to an example embodiment. The method 200 is an example of a method that may be performed by one or more services that execute on one or more servers, such as the one or more servers 110 of the system 100 illustrated and described with regard to FIG. 1.

In some embodiments, the method 200 includes identifying 202 a mobile device present within a facility, associating 204 the mobile device with an account holder, and transmitting 206, to the mobile device, data representative of transaction options identified in stored data based on an identity of the facility and the account holder. In some such embodiments, the data representative of the transaction options is further identified based on account history data of at least one account of the account holder. Such transaction options may include a transaction offer, such as to take out a loan or open a new account. The transaction options may also, or further, include one or more options for depositing or withdrawing funds, making a loan payment, cashing a check, accessing a safety deposit box, among other transactions. In some other embodiments, such as when the method 200 is performed in a non-banking environment, the transaction options may include one or more of an option to return a product previously purchased, to begin a checkout process by scanning items via an imaging device integrated within an account holder mobile device, and the like.

In some embodiments of the method 200, identifying 202 a mobile device present within the facility includes receiving data in a network communication including a mobile device identifier and an identifier associated with the facility. The associating 204 the mobile device with the account holder in some of these embodiments, and others, includes retrieving account holder data from a database based on the received mobile device identifier, the mobile device identifier associated with at least one account holder record stored in the database. The database may be accessed via a network, such as the network 108, from a server process, such as a process or web service provided by the one or more servers 110 of FIG. 1.

In some further embodiments, the data representative of transaction options identified in the stored data based on the identity of the facility and the account holder is determined based upon at least one account of the account holder and transaction options that can be performed with regard to a type of each of the at least one account within the facility. These transaction options may be determined based upon facility configuration data stored in the database that identifies transaction options with regard to account types.

Some embodiments also include receiving, from the mobile device, data identifying a transaction option selected within an app that executes on the mobile device and transaction data of a transaction to be completed by the account holder. The method 200 may then identify a terminal at which the transaction to be completed by the account holder is to be performed, such as within or with regard to facility configuration data discussed above that includes data defining terminals in the facility. This facility configuration data may also include or be associated with data identifying tellers, clerks, terminal device characteristics, locations of terminals within the facility, and the like with regard to some or all terminals present in the facility. The method 200 may then transmit data to the mobile device identifying the terminal at which the account holder is to perform the transaction, which may be determined based on the configuration data based on a location of the mobile device with regard to terminal locations. This data may then be presented to the account holder by the app that executes on the mobile device to direct the account holder to the identified terminal. At the same time, the method 200 includes transmitting at least the transaction data to the identified terminal or otherwise making the data available to the identified terminal for retrieval. Note that the identified terminal may be a human-assisted customer service station, such as a bank teller window or personal banker station. Similarly, the identified terminal may be a self-service terminal, such as an ATM or a self-service checkout station in a non-banking environment.

In some of these embodiments, when identifying the terminal, an estimated wait time may also be determined based on a number of account holders and transactions queue to the identified terminal. This estimated wait time may also be transmitted to the mobile device app.

In another embodiment of the method 200, when the associating 204 of the mobile device with the account holder is unsuccessful, the method 200 includes transmitting data to the mobile device indicating the mobile device is not associated with an account holder. The transmitted data may further instruct an app that executes on the mobile device to provide a mobile device registration option. The registration option may provide one or both options to associate the mobile device with an existing account or to initiate opening of a new account.

Figure 3:
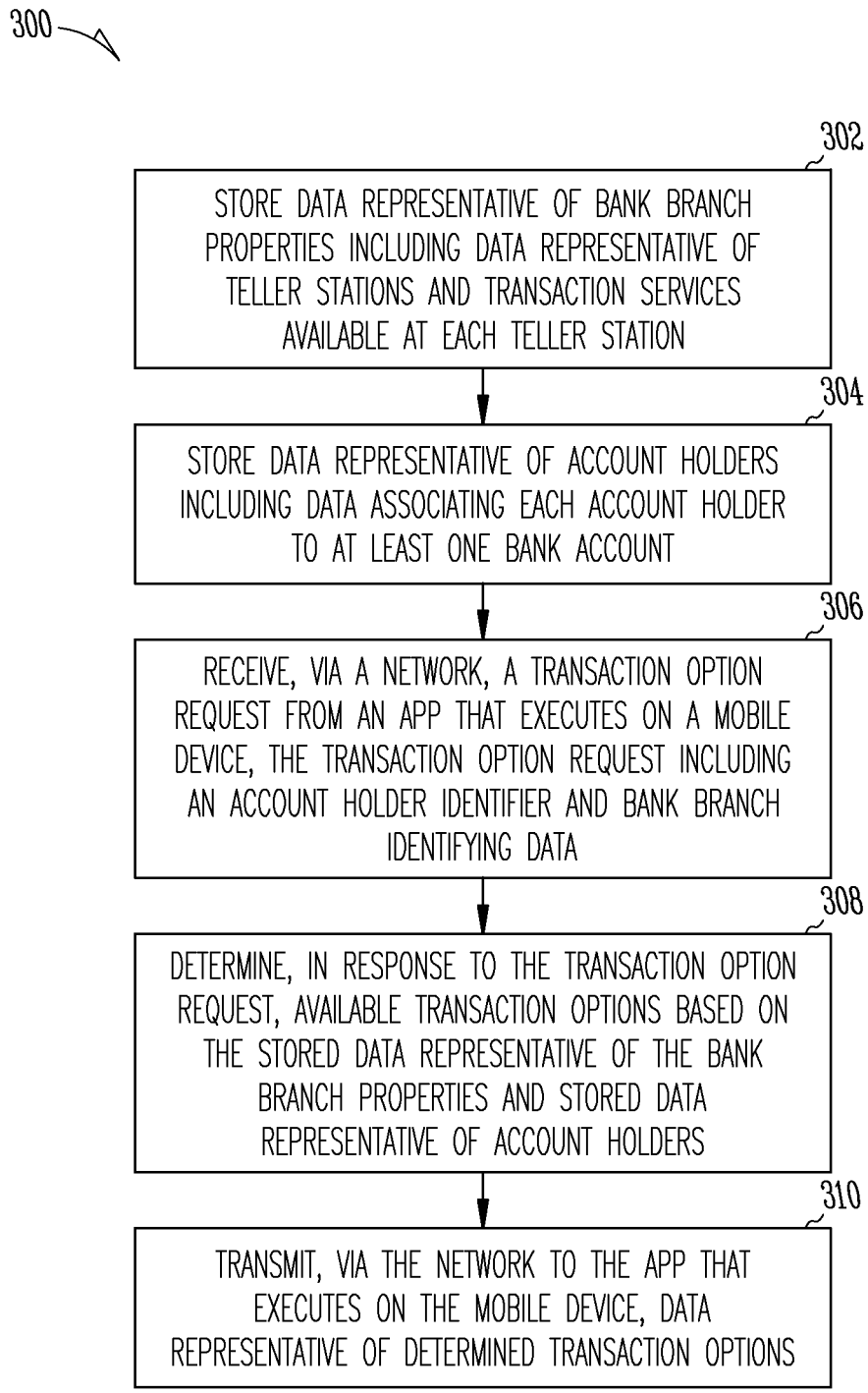
FIG. 3 is a block flow diagram of a method, according to an example embodiment.

FIG. 3 is a block flow diagram of a method 300, according to an example embodiment. The method 300 is an example of another method that may be performed by one or more services that execute on one or more servers, such as the one or more servers 110 of the system 100 illustrated and described with regard to FIG. 1.

The method 300 includes storing 302 data representative of bank branch properties including data representative of teller stations and transaction services available at each teller station. The method 300 also stores 304 data representative of account holders including data associating each account holder to at least one bank account. This data may be stored in one or more databases that may be databases of a core banking system or other system, or a replication of data therefrom. The method 300 further includes receiving 306, via a network, a transaction option request from an app that executes on a mobile device. The transaction option request is typically received 306 with data including an account holder identifier and bank branch identifying data, such as an identifier of a specific bank branch or a location from which the bank branch is identifiable. In response to the transaction option request, the method 300 further determines 308 available transaction options based on the stored 302, 304 data representative of the bank branch properties and stored data representative of account holders. The method 300 then transmits 310, via the network to the app, data representative of determined 308 transaction options.

Figure 4:
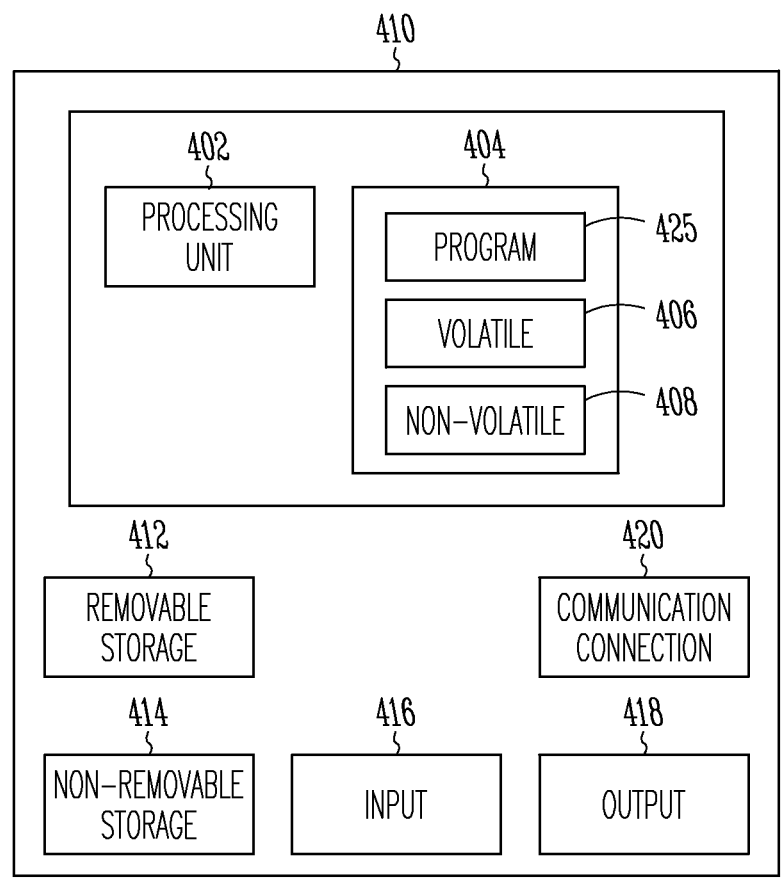
FIG. 4 is a block diagram of a computing device, according to an example embodiment.

FIG. 4 is a block diagram of a computing device, according to an example embodiment. In one embodiment, multiple such computer systems are utilized in a distributed network to implement multiple components in a transaction-based environment. An object-oriented, service-oriented, or other architecture may be used to implement such functions and communicate between the multiple systems and components. One example computing device in the form of a computer 410, may include a processing unit 402, memory 404, removable storage 412, and non-removable storage 414. Although the example computing device is illustrated and described as computer 410, the computing device may be in different forms in different embodiments. For example, the computing device may instead be a smartphone, a tablet, or other computing device including the same or similar elements as illustrated and described with regard to FIG. 4. Further, although the various data storage elements are illustrated as part of the computer 410, the storage may also or alternatively include cloud-based storage accessible via a network, such as the Internet.

Returning to the computer 410, memory 404 may include volatile memory 406 and non-volatile memory 408. Computer 410 may include—or have access to a computing environment that includes a variety of computer-readable media, such as volatile memory 406 and non-volatile memory 408, removable storage 412 and non-removable storage 414. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 410 may include or have access to a computing environment that includes input 416, output 418, and a communication connection 420. The input 416 may include one or more of a touchscreen, touchpad, mouse, keyboard, camera, and other input devices. The computer may operate in a networked environment using a communication connection 420 to connect to one or more remote computers, such as database servers, web servers, and other computing device. An example remote computer may include a personal computer (PC), server, router, network PC, a peer device or other common network node, or the like. The communication connection 420 may be a network interface device such as one or both of an Ethernet card and a wireless card or circuit that may be connected to a network. The network may include one or more of a Local Area Network (LAN), a Wide Area Network (WAN), the Internet, and other networks.

Computer-readable instructions stored on a computer-readable medium are executable by the processing unit 402 of the computer 410. A hard drive (magnetic disk or solid state), CD-ROM, and RAM are some examples of articles including a non-transitory computer-readable medium. For example, various computer programs 425 or apps, such as one or more applications and modules implementing one or more of the methods illustrated and described herein or an app or application that executes on a mobile device or is accessible via a web browser, may be stored on a non-transitory computer-readable medium.

A further embodiment is in the form of a system. The system of such embodiments includes a network interface device and at least one database accessible via the network interface device. The database stores data representative of bank branch properties including data representative of teller stations and transaction services available at each teller station. The database also stores data representative of account holders including data associating each account holder to at least one bank account. Such embodiments further include an interactive banking services module to perform data processing activities.

The data processing activities that may be performed by the interactive banking services module include receiving, via the network interface device, a transaction option request from an app that executes on a mobile device, the transaction option request including an account holder identifier and bank branch identifying data. The data processing activities further include determining, in response to the transaction option request, available transaction options based on the data representative of the bank branch properties and data representative of account holders as stored in the at least one database. The data processing activities also include transmitting, via the network interface device to the app that executes on the mobile device, data representative of determined transaction options.

In some embodiments, the interactive banking services module is or includes a hardware element dedicated to at least these data processing activities. In other embodiments, the interactive banking services module is a set of instructions stored on a non-transitory computer-readable medium that are executable by at least one processor to perform the data processing activities.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A method comprising:
   storing data representative of bank branch properties including data representative of teller stations and transaction services available at each teller station;
   storing data representative of account holders including data associating each account holder to at least one bank account;
   receiving, via a network, a transaction option request from an app that executes on a mobile device, the transaction option request including an account holder identifier and bank branch identifying data;
   determining, in response to the transaction option request, available transaction options based on the stored data representative of the bank branch properties and stored data representative of account holders; and
   transmitting, via the network to the app that executes on the mobile device, data representative of determined transaction options.

2. The method of claim 1, wherein the data representative of the determined transaction options is further identified based on account history data of at least one account of the account holder.

3. The method of claim 1, wherein the determined transaction options include at least one transaction offer.

4. The method of claim 1, wherein identifying a mobile device present within the facility includes:
   receiving data in a network communication including a mobile device identifier and an identifier associated with the facility.

5. The method of claim 1, wherein the data representative of transaction options identified in the stored data based on the identity of the facility and the account holder is determined based upon at least one account of the account holder and transaction options that can be performed with regard to a type of each of the at least one account within the facility.

6. The method of claim 5, wherein the transaction options that can be performed with regard to the type of each of the at least one account within the facility is determined based upon facility configuration data stored in the database that identifies transaction options with regard to account types.

7. The method of claim 1, wherein when the account holder identifier is invalid, transmitting data to the app that executes on the mobile device indicating the account holder identifier is invalid and instructing an app that executes on the mobile device to provide a registration option.

8. The method of claim 1,
   receiving, via the network from the app that executes on the mobile device, data identifying a transaction option selected within the app and transaction data of a transaction to be completed by the account holder;
   identifying a teller station defined in the data representative of bank branch properties at which the transaction to be completed by the account holder is to be performed;
   transmitting, via the network to the app that executes on the mobile device, data identifying the identified teller station for presentation by the app that executes on the mobile device to direct the account holder to the identified teller station; and
   transmitting at least the transaction data to the identified teller station.

9. The method of claim 8, wherein the identified teller station is a computer located at a human-assisted customer service station.

10. The method of claim 8, wherein:
identifying the teller station includes estimating a wait time for the account holder prior to being serviced by the identified teller station; and
the data transmitted to the app that executes on the mobile device includes data representative of the estimated wait time.

11. The method of claim 8, wherein the identified teller station is an Automated Teller Machine (ATM).

12. The method of claim 1, wherein the bank branch identifying data is an identifier of a beacon transceiver device deployed in the bank branch, the identifier of the beacon transceiver device included in the stored data representative of the bank branch properties.

13. A system comprising:
a network interface device;
at least one database accessible via the network interface device, the database storing:
data representative of bank branch properties including data representative of teller stations and transaction services available at each teller station;
data representative of account holders including data associating each account holder to at least one bank account;
an interactive banking services module to perform data processing activities comprising:
receiving, via the network interface device, a transaction option request from an app that executes on a mobile device, the transaction option request including an account holder identifier and bank branch identifying data;
determining, in response to the transaction option request, available transaction options based on the data representative of the bank branch properties and data representative of account holders as stored in the at least one database; and
transmitting, via the network interface device to the app that executes on the mobile device, data representative of determined transaction options.

14. The system of claim 13, wherein the interactive banking services module is further executable to perform data processing activities comprising:
receiving, via the network from the app that executes on the mobile device, data identifying a transaction option selected within the app and transaction data of a transaction to be completed by the account holder;
identifying a teller station defined in the data representative of bank branch properties at which the transaction to be completed by the account holder is to be performed;
transmitting, via the network to the app that executes on the mobile device, data identifying the identified teller station for presentation by the app that executes on the mobile device to direct the account holder to the identified teller station; and
transmitting at least the transaction data to the identified teller station.

15. The system of claim 13, wherein the bank branch identifying data is an identifier of a beacon transceiver device deployed in the bank branch, the identifier of the beacon transceiver device included in the stored data representative of the bank branch properties.

16. The system of claim 15, wherein the identified teller station is a computer located at a teller window.

17. The system of claim 13, further comprising:
at least one processor and at least one memory device; and
wherein the interactive banking services module includes instructions stored on the at least one memory device and are executable by the at least one processor to perform the data processing activities.

* * * * *